United States Patent
Milstein et al.

(10) Patent No.: US 7,502,364 B2
(45) Date of Patent: Mar. 10, 2009

(54) EXTENSIBLE METADATA STRUCTURE

(75) Inventors: David Milstein, Redmond, WA (US);
David A. Howell, Seattle, WA (US);
Linda Criddle, Kirkland, WA (US);
Michael D. Malueg, Renton, WA (US);
Philip Andrew Chou, Bellevue, WA (US); Scott C. Forbes, Redmond, WA (US); Kuansan Wang, Bellevue, WA (US); Timothy M. Moore, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 161 days.

(21) Appl. No.: 11/394,773

(22) Filed: Mar. 31, 2006

(65) Prior Publication Data

US 2007/0263607 A1 Nov. 15, 2007

(51) Int. Cl.
*H04L 12/66* (2006.01)

(52) U.S. Cl. .................. 370/356; 370/352; 370/353; 370/354; 370/355; 379/88.13; 379/88.17; 709/203; 709/206; 709/207; 715/749; 715/760

(58) Field of Classification Search ............ 379/88.19, 379/373.01, 355.03, 88.13, 88.17; 370/352–356; 709/203, 206–207; 715/749, 760
See application file for complete search history.

(56) References Cited

U.S. PATENT DOCUMENTS

| 2004/0203886 | A1* | 10/2004 | Rohles et al. | ............ | 455/456.1 |
| 2004/0208304 | A1* | 10/2004 | Miller | ................... | 379/210.02 |
| 2006/0153357 | A1* | 7/2006 | Acharya et al. | ........ | 379/266.01 |
| 2007/0047726 | A1* | 3/2007 | Jabbour et al. | ......... | 379/373.02 |

* cited by examiner

*Primary Examiner*—Fan Tsang
*Assistant Examiner*—Hemant Patel
(74) *Attorney, Agent, or Firm*—Merchant & Gould; Ryan T. Grace

(57) ABSTRACT

Structured hierarchies for communicating contextual information relating to a VoIP conversation are provided. The structured hierarchies are utilized for efficient communications of various amounts and types of contextual information over a VoIP conversation channel. Information identifying at least one structured hierarchy, which will be used to carry the contextual information, is transmitted during establishment of a conversation between two VoIP enhanced devices and prior to the exchange of contextual information. The structural hierarchy is selected from a set of predefined and declared structured hierarchies. Subsequently transmitted contextual information exchanged between two VoIP enhanced devices is represented in accordance with the identified structural hierarchy. Additionally, the structural hierarchies can be extensible by the addition of more definitions to the current structural hierarchies.

20 Claims, 13 Drawing Sheets

EXTENSIBLE METADATA STRUCTURE

BACKGROUND

Generally described, an Internet telephony system provides an opportunity for users to have a call connection with enhanced calling features compared to a conventional Public Switched Telephone Network (PSTN)-based telephony system. In a typical Internet telephony system, often referred to as Voice over Internet Protocol (VoIP), audio information is processed into a sequence of data blocks, called packets, for communications utilizing an Internet Protocol (IP) data network. During a VoIP call conversation, the digitized voice is converted into small frames of voice data and a voice data packet is assembled by adding an IP header to the frame of voice data that is transmitted and received.

VoIP technology has been favored because of its flexibility and portability of communications, ability to establish and control multimedia communication, and the like. VoIP technology will likely continue to gain favor because of its ability to provide enhanced calling features and advanced services. However, as enhanced calling features and advanced services grow in popularity and complexity, the amount of contextual information to be transmitted in order to provide such features and services becomes excessively large. With regard specifically to enhanced calling features and advanced services, current VoIP approaches can become inefficient for transferring large amounts of contextual information and not flexible in expanding data structures.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Structured hierarchies for communicating contextual information relating to a VoIP conversation are provided. The structured hierarchies are utilized for efficient communications of various amounts and types of contextual information over a VoIP conversation channel. Information identifying at least one structured hierarchy, which will be used to carry the contextual information, is transmitted during establishment of a conversation between two VoIP enhanced devices and prior to the exchange of contextual information. The structural hierarchy is selected from a set of predefined and declared structured hierarchies. Subsequently transmitted contextual information exchanged between two VoIP enhanced devices is represented in accordance with the identified structural hierarchy. Additionally, the structural hierarchies can be extensible by the addition of more definitions to the current structural hierarchies.

In accordance with an aspect of the present invention, a method for communicating contextual information is provided. A conversation channel is established between two clients. Conversation data packets and contextual data packets are transmitted between two clients over the communication channel. The contextual data packet containing contextual information is defined according to an identified structured hierarchy of the contextual information.

In accordance with another aspect of the method, the structured hierarchy can correspond to a set of classes and attributes defining contextual information between two VoIP devices. The set of classes can include call basics class, call contexts class, device type class, and client class, among others. The set of attributes relating to the call basics class can include call priority, namespace information, call type and the like. The set of attributes relating to the call contexts class can include subject information, file identification, and keywords relating to the conversation. The set of attributes relating to the device type class can include audio information about a device, video information about a device, and other device specific information. Further, the set of attributes relating to the client class can include client biometrics information, client location information, and client rules. The structural hierarchies can be extensible by adding more classes and/or attributes to the current structural hierarchies.

In accordance with another aspect of the present invention, a computer-readable medium having computer-executable components for communicating contextual information over a communication channel is provided. The computer-executable components include a conversation component corresponding to data associated with a conversation and a contextual information component related to the conversation component and corresponding to a structured hierarchy of contextual information. The structured hierarchy corresponds to a set of classes and attributes defining the contextual information. Further, the set of classes and attributes of the structured hierarchy correspond to a predefined namespace including call basics class, call contexts class, device type class, and client class.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present invention relates to the utilization of structured hierarchies for communicating contextual information relating to a Voice over Internet Protocol (VoIP) conversation. More specifically, the present invention relates to the utilization of defining classes and attributes in "structured hierarchies" for representing contextual information over a communication channel in an Internet Protocol (IP) network environment. "Structured hierarchies," as used herein, are predefined organizational structures for arranging contextual information to be exchanged between two or more VoIP devices. For example, structured hierarchies can be defined by hierarchical organizations of various classes and attributes, such as XML namespaces. Further, a VoIP conversation is a data stream of information related to a conversation, such as contextual information and voice information, exchanged over a conversation channel. Although the present invention will be described with relation to illustrative structural hierarchies and an illustrative IP telephony environment, one skilled in the relevant art will appreciate that the disclosed embodiments are illustrative in nature and should not be construed as limiting.

Figure 1:
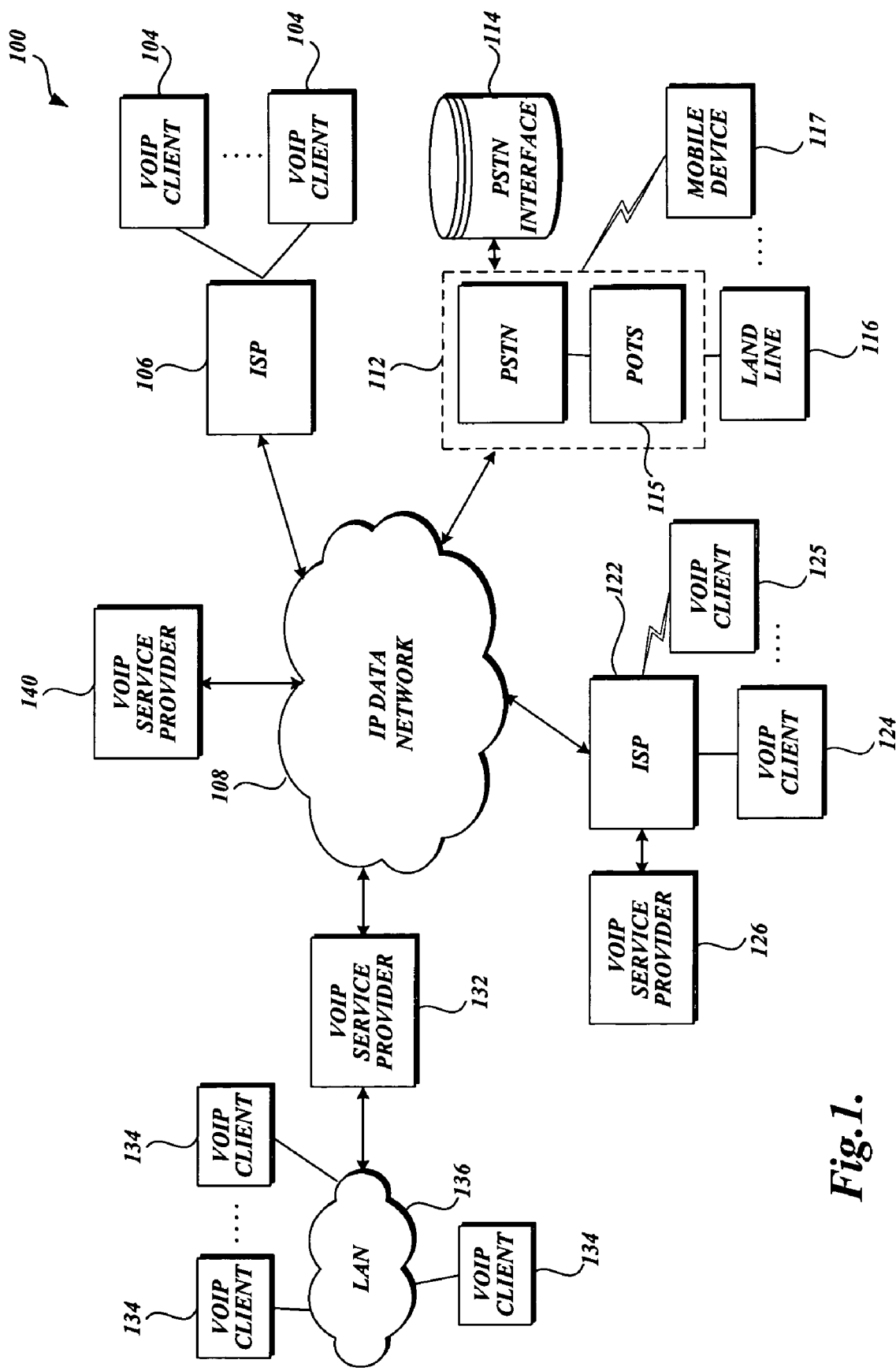
FIG. 1 is a block diagram illustrative of a VoIP environment for providing establishing a conversation channel between various clients in accordance with an aspect of the present invention.

With reference to FIG. 1, a block diagram of an IP telephony environment 100 for providing IP telephone services between various "VoIP clients" is shown. A "VoIP client," as used herein, refers to a particular contact point, such as an individual, an organization, a company, etc., one or more associated VoIP devices and a unique VoIP client identifier. For example, a single individual, five associated VoIP devices and a unique VoIP client identifier collectively makeup a VoIP client. Similarly, a company including five hundred individuals and over one thousand associated VoIP devices may also be collectively referred to as a VoIP client and that VoIP client may be identified by a unique VoIP client identifier. Moreover, VoIP devices may be associated with multiple VoIP clients. For example, a computer (a VoIP device) located in a residence in which three different individuals live, each individual associated with separate VoIP clients, may be associated with each of the three VoIP clients. Regardless of the combination of devices, the unique VoIP client identifier may be used within a voice system to reach the contact point of the VoIP client.

Generally described, the IP telephony environment 100 may include an IP data network 108 such as the Internet, an intranet network, a wide area network (WAN), a local area network (LAN) and the like. The IP telephony environment 100 may further include VoIP service providers 126, 132 providing VoIP services to VoIP clients 124, 125, 134. A VoIP call conversation may be exchanged as a stream of data packets corresponding to voice information, media information, and/or contextual information. As will be discussed in greater detail below, the contextual information includes metadata (information of information) relating to the VoIP conversation, the devices being used in the conversation, the contact point of the connected VoIP clients, and/or individuals that are identified by the contact point (e.g., employees of a company).

The IP telephony environment 100 may also include third party VoIP service providers 140. The VoIP service providers 126, 132, 140 may provide various calling features, such as incoming call-filtering, text data, voice and media data integration, and the integrated data transmission as part of a VoIP call conversation. The VoIP service providers 126, 132, 140 may also generate, maintain, and provide voice profiles for individuals communicating in a call conversation. As an alternative, or in addition thereto, VoIP clients 104, 124, 125, 136 may create, maintain, and provide voice profiles.

VoIP service providers 132 may be coupled to a private network such as a company LAN 136, providing IP telephone services (e.g., internal calls within the private network, external calls outside of the private network, and the like) and multimedia data services to several VoIP clients 134 communicatively connected to the company LAN 136. Similarly, VoIP service providers, such as VoIP service provider 126, may be coupled to Internet Service Provider (ISP) 122, providing IP telephone services and VoIP services for clients of the ISP 122.

In one embodiment, one or more ISPs 106, 122 may be configured to provide Internet access to VoIP clients 104, 124, 125 so that the VoIP clients 104, 124, 125 can maintain conversation channels established over the Internet. The VoIP clients 104, 124, 125 connected to the ISP 106, 122 may use wired and/or wireless communication lines. Further, each VoIP client 104, 124, 125, 134 can communicate with Plain Old Telephone Service (POTS) 115 communicatively connected to a PSTN 112. A PSTN interface 114 such as a PSTN gateway may provide access between PSTN and the IP data network 108. The PSTN interface 114 may translate VoIP data packets into circuit switched voice traffic for PSTN and vice versa. The PSTN 112 may include a land line device 116, a mobile device 117, and the like.

Conventional voice devices, such as land line 116 may request a connection with the VoIP client based on the unique VoIP identifier of that client and the appropriate VoIP device associated with the VoIP client, will be used to establish a connection. In one example, an individual associated with the VoIP client may specify which devices are to be used in connecting a call based on a variety of conditions (e.g., connection based on the calling party, the time of day, etc.).

It is understood that the environment 100 is merely exemplary. It will be appreciated by one of ordinary skill in the art that various VoIP entities on Internet, intranet, and/or any combination of networks suitable for exchanging media and contextual information can be part of the environment 100. For example, VoIP clients 134 coupled to LAN 136 may be able to communicate with other VoIP clients 104, 124, 125, with or without VoIP service provider 132. Further, an ISP 106, 122 can also provide VoIP services to its client.

Figure 2:
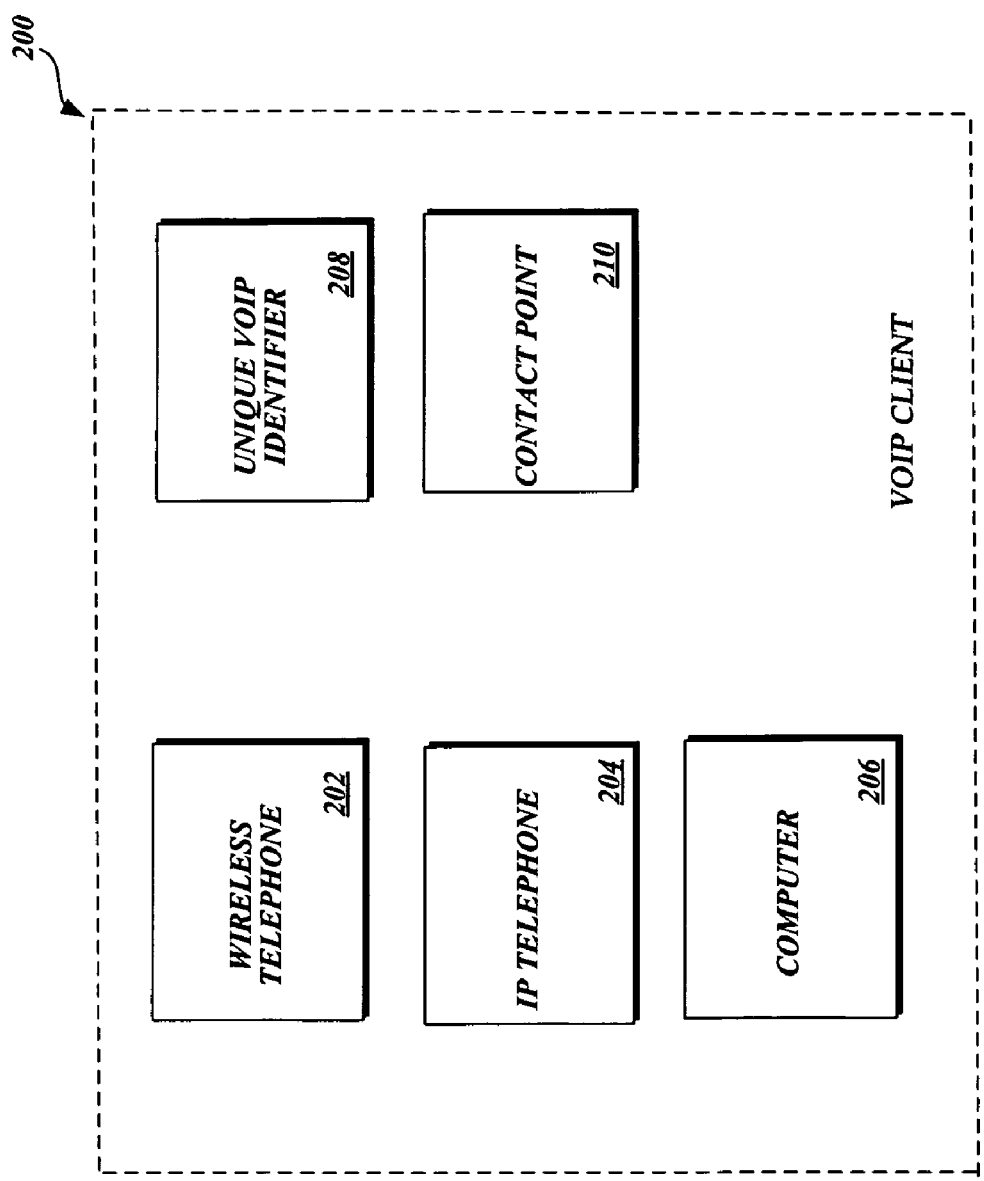
FIG. 2 is a block diagram illustrative of various VoIP devices corresponding to a VoIP client in accordance with an aspect of the present invention.

Referring now to FIG. 2, a block diagram illustrating an exemplary VoIP client 200 that includes several VoIP devices and a unique VoIP identifier, in accordance with an embodiment of the present invention, is shown. Each VoIP device 202, 204, 206 may include a storage that is used to maintain voice messages, address books, client specified rules, priority information related to incoming calls, etc. Alternatively, or in addition thereto, a separate storage, maintained for example by a service provider, may be associated with the VoIP client and accessible by each VoIP device that contains information relating to the VoIP client. In an embodiment, any suitable VoIP device such as a wireless phone 202, an IP phone 204, or a computer 206 with proper VoIP applications may be part of the VoIP client 200. The VoIP client 200 also maintains one or more unique VoIP identifier 208. The unique VoIP identifier(s) 208 may be constant or change over time. For example, the unique identifier(s) 208 may change with each call. The unique VoIP identifier is used to identify the client and to connect with the contact point 210 associated with the VoIP client. The unique VoIP identifier may be maintained on each VoIP device included in the VoIP client and/or maintained by a service provider that includes an association with each VoIP device included in the VoIP client. In the instance in which the unique VoIP identifier is maintained by a service provider, the service provider may include information about each associated VoIP device and knowledge as to which device(s) to connect for incoming communications. In alternative embodiment, the VoIP client 200 may maintain multiple VoIP identifiers. In this embodiment, a unique VoIP identifier may be temporarily assigned to the VoIP client 200 for each call session.

The unique VoIP identifier may be used similar to a telephone number in PSTN. However, instead of dialing a typical telephone number to ring a specific PSTN device, such as a home phone, the unique VoIP identifier is used to reach a contact point, such as an individual or company, which is associated with the VoIP client. Based on the arrangement of the client, the appropriate device(s) will be connected to reach the contact point. In one embodiment, each VoIP device included in the VoIP client may also have its own physical address in the network or a unique device number. For example, if an individual makes a phone call to a POTS client using a personal computer (VoIP device), the VoIP client identification number in conjunction with an IP address of the personal computer will eventually be converted into a telephone number recognizable in PSTN.

Figure 3:
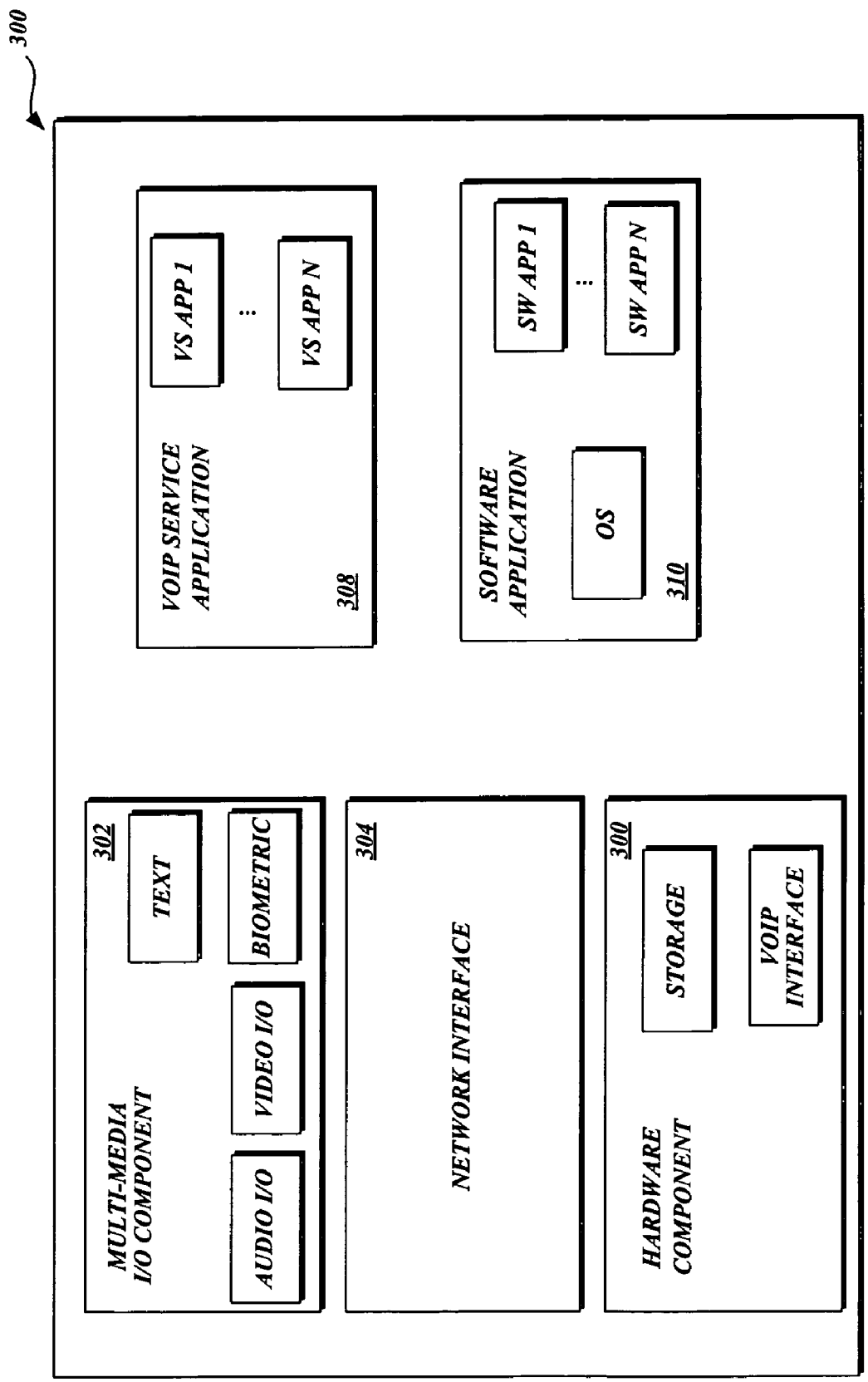
FIG. 3 is a block diagram illustrative of various components associated with a VoIP client device in accordance with an aspect of the present invention.

FIG. 3 is a block diagram of a VoIP device 300 that may be associated with one or more VoIP clients and used with embodiments of the present invention. It is to be noted that the VoIP device 300 is described as an example. It will be appreciated that any suitable device with various other components can be used with embodiments of the present invention. For utilizing VoIP services, the VoIP device 300 may include components suitable for receiving, transmitting and processing various types of data packets. For example, the VoIP device 300 may include a multimedia input/output component 302 and a network interface component 304. The multimedia input/output component 302 may be configured to input and/or output multimedia data (including audio, video, and the like), user biometrics, text, application file data, etc. The multimedia input/output component 302 may include any suitable user input/output components such as a microphone, a video camera, a display screen, a keyboard, user biometric recognition devices and the like. The multimedia input/output component 302 may also receive and transmit multimedia data via the network interface component 304. The network interface component 304 may support interfaces such as Ethernet interfaces, frame relay interfaces, cable interfaces, DSL interfaces, token ring interfaces, radio frequency (air interfaces), and the like. The VoIP device 300 may comprise a hardware component 306 including permanent and/or removable storage such as read-only memory devices (ROM), random access memory (RAM), hard drives, optical drives, and the like. The storage may be configured to store program instructions for controlling the operation of an operating system and/or one or more applications and to store contextual information related to individuals (e.g., voice profiles) associated with the VoIP client in which the device is included. In one embodiment, the hardware component 306 may include a VoIP interface card which allows non-VoIP client device to transmit and receive a VoIP conversation.

The device 300 may further include a software application component 310 for the operation of the device 300 and a VoIP Service application component 308 for supporting various VoIP services. The VoIP service application component 308 may include applications such as data packet assembler/disassembler applications, a structured hierarchy parsing application, audio Coder/Decoder (CODEC), video CODEC and other suitable applications for providing VoIP services. The CODEC may use voice profiles to filter and improve incoming audio.

Figure 4:
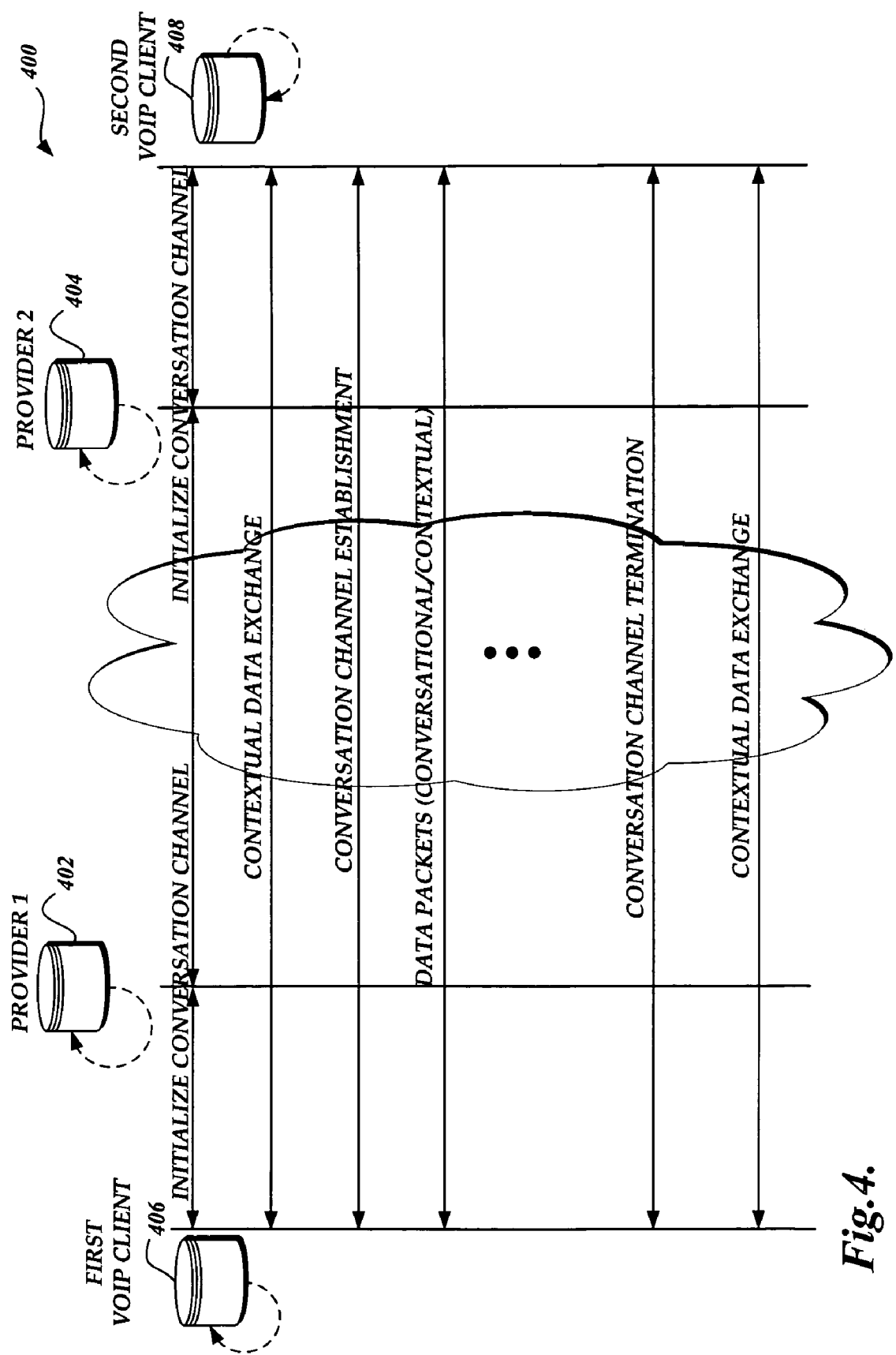
FIG. 4 is a block diagram illustrative of the exchange of data between two VoIP clients over a conversation channel in accordance with an aspect of the present invention.

With reference to FIG. 4, a block diagram illustrative of a conversation flow 400 between VoIP devices of two different VoIP clients over a conversation channel, in accordance with an embodiment of the present invention, is shown. During a connection set-up phase, a VoIP device of a first VoIP client 406 requests to initiate a conversation channel with a second VoIP client 408. In an illustrative embodiment, a VoIP service provider 402 (Provider 1) for the first VoIP client 406 receives the request to initiate a conversation channel and forwards the request to a VoIP service provider 404 (Provider 2) for the second VoIP client 406. While this example utilizes two VoIP service providers and two VoIP clients, any number and combination of VoIP clients and/or service providers may be used with embodiments of the present invention. For example, only one service provider may be utilized in establishing the connection. In yet another example, communication between VoIP devices may be direct, utilizing public and private lines, thereby eliminating the need for a VoIP service provider. In a peer to peer context, communication between VoIP devices may also be direct without having any service providers involved.

There are a variety of protocols that may be selected for use in exchanging information between VoIP clients, VoIP devices, and/or VoIP service providers. For example, when Session Initiation Protocol (SIP) is selected for a signaling protocol, session control information and messages will be exchanged over a SIP signaling path/channel and media streams will be exchanged over Real-Time Transport Protocol (RTP) path/channel. For the purpose of discussion, a communication channel, as used herein, generally refers to any type of data or signal exchange path/channel. Thus, it will be appreciated that depending on the protocol, a connection set-up phase and a connection termination phase may require additional steps in the conversation flow 400.

For ease of explanation, we will utilize the example in which both the first VoIP client 406 and the second VoIP client 408 each only includes one VoIP device. Accordingly, the discussion provided herein will refer to connection of the two VoIP devices. The individual using the device of the first VoIP client 406 may select or enter the unique VoIP identifier of the client that is to be called. Provider 1 402 receives the request from the device of the first VoIP client 408 and determines a terminating service provider (e.g., Provider 2 404 of the second VoIP client 408) based on the unique VoIP identifier included in the request. The request is then forwarded to Provider 2 404. This call initiation will be forwarded to the device of the second VoIP client. A conversation channel between the device of the first VoIP client 406 and a device of the second VoIP client 408 can then be established.

In an illustrative embodiment, before the devices of the first VoIP client 406 and the second VoIP client 408 begin to exchange data packets, contextual information may be exchanged. As will be discussed in a greater detail below, the contextual information may be packetized in accordance with a predefined structure that is associated with the conversation. Any device associated with the first VoIP client 406, the service provider of the first VoIP client 406, or a different device/service provider may determine the structure based on the content of the contextual information. In one embodiment, the exchanged contextual information may include information relating to the calling VoIP client 406, the device, and the VoIP client 408 being called. For example, the contextual information sent from the called VoIP client 406 may include priority list of incoming calls from various potential calling VoIP clients including VoIP client 406.

Available media types, rules of the calling client and the client being called, and the like, may also be part of the contextual information that is exchanged during the connection set-up phase. The contextual information may be processed and collected by one the devices of the first VoIP client 406, one of the devices of the second VoIP client 408, and/or by VoIP service providers (e.g., Provider 1 402 and Provider 2 404), depending on the nature of the contextual information. In one embodiment, the VoIP service providers 402, 404 may add/or delete some information to/from the client's contextual information before forwarding the contextual information.

In response to a request to initiate a conversation channel, the second VoIP client 408 may accept the request for establishing a conversation channel or execute other appropriate actions such as rejecting the request via Provider 2 404. The appropriate actions may be determined based on the obtained contextual information. When a conversation channel is established, a device of the first VoIP client 406 and a device of the second VoIP client 408 start communicating with each other by exchanging data packets. As will be described in greater detail, the data packets, including conversation data packets and contextual data packets, are communicated over the established conversation channel between the connected devices.

Conversation data packets carry data related to a conversation, for example, a voice data packet, or multimedia data packet. Contextual data packets carry information relating to data other than the conversation data. Once the conversation channel is established, either the first VoIP client 406 or the second VoIP client 408 can request to terminate the conversation channel. Some contextual information may be exchanged between the first VoIP client 406 and the second VoIP client 408 after the termination.

Figure 5:
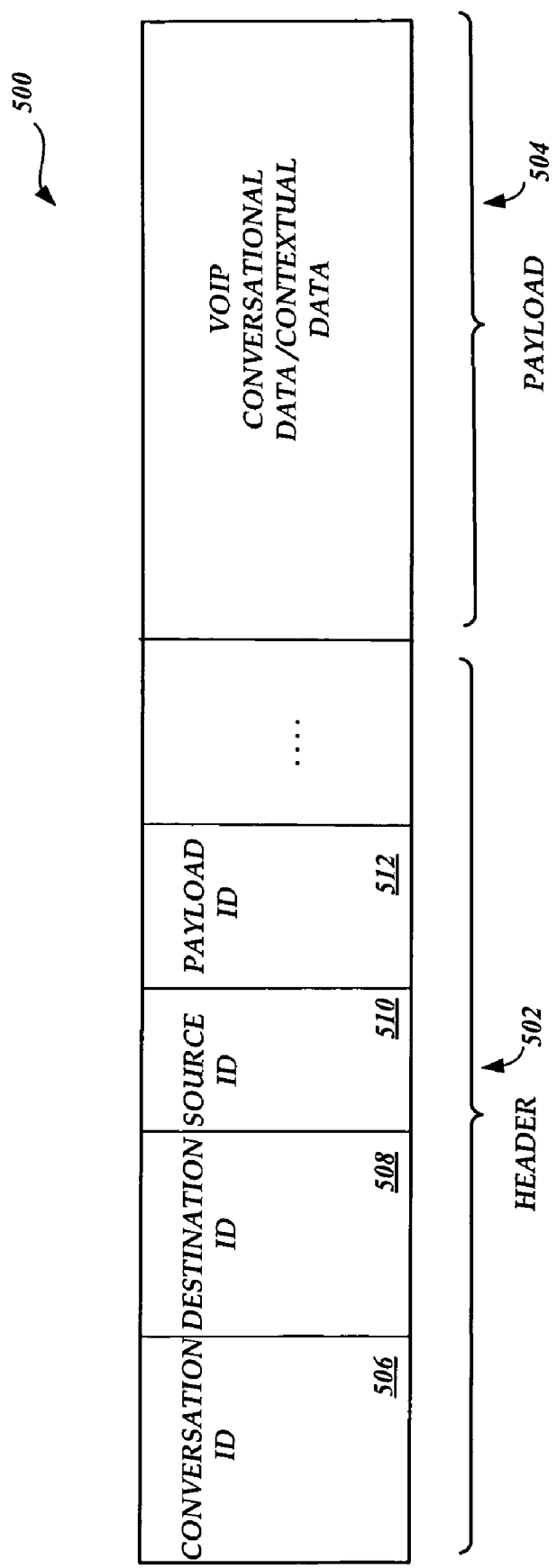
FIG. 5 is a block diagram of a data packet used over a communication channel established in the VoIP environment of FIG. 1.

FIG. 5 is a block diagram of a data packet structure 500 used over a communication (conversation) channel in accordance with an embodiment of the present invention. The data packet structure 500 may be a data packet structure for an IP data packet suitable for being utilized to carry conversation data (e.g., voice, multimedia data, and the like) or contextual data (e.g., information relating to the VoIP services, and the like). However, any other suitable data structure can be utilized to carry conversation data or contextual data. The data packet structure 500 includes a header 502 and a payload 504. The header 502 may contain information necessary to deliver the corresponding data packet to a destination. Additionally, the header 502 may include information utilized in the process of a conversation. Such information may include conversation ID 506 for identifying a conversation (e.g., call), a Destination ID 508, such as a unique VoIP identifier of the client being called, a Source ID 510 (unique VoIP identifier of the calling client or device identifier), Payload ID 512 for identifying type of payload (e.g., conversation or contextual), individual ID (not shown) for identifying the individual for which the conversation data is related, and the like. In an alternative embodiment, the header 502 may contain information regarding Internet protocol versions, and payload length, among others. The payload 504 may include conversational or contextual data relating to an identified conversation. As will be appreciated by one of ordinary skill in the art, additional headers may be used for upper layer headers such as a TCP header, a UDP hearer, and the like.

In one embodiment of the present invention, a structured hierarchy may be predefined for communicating contextual information over a VoIP conversation channel. The contextual information may include any information relating to VoIP clients, VCD devices, conversation channel connections (e.g., call basics), conversation context (e.g., call context) and the like. More specifically, the contextual information may include individual user preference, client rules, client's location (e.g., user location, device location, etc.), biometrics information, the client's confidential information, VoIP device's functionality, VoIP service providers information, media type, media parameters, calling number priority, keywords, information relating to application files, and the like. The contextual information may be processed and collected at each VoIP client and/or the VoIP service providers depending on the nature of the contextual data. In one aspect, the VoIP service providers may add, modify and/or delete VoIP client's contextual data before forwarding the contextual information. For example, client's confidential information will be deleted by the VoIP service provider associated with that client unless the client authorizes such information to be transmitted. In some cases, a minimal amount of contextual information is transmitted outside of an intranet network.

Figure 6:
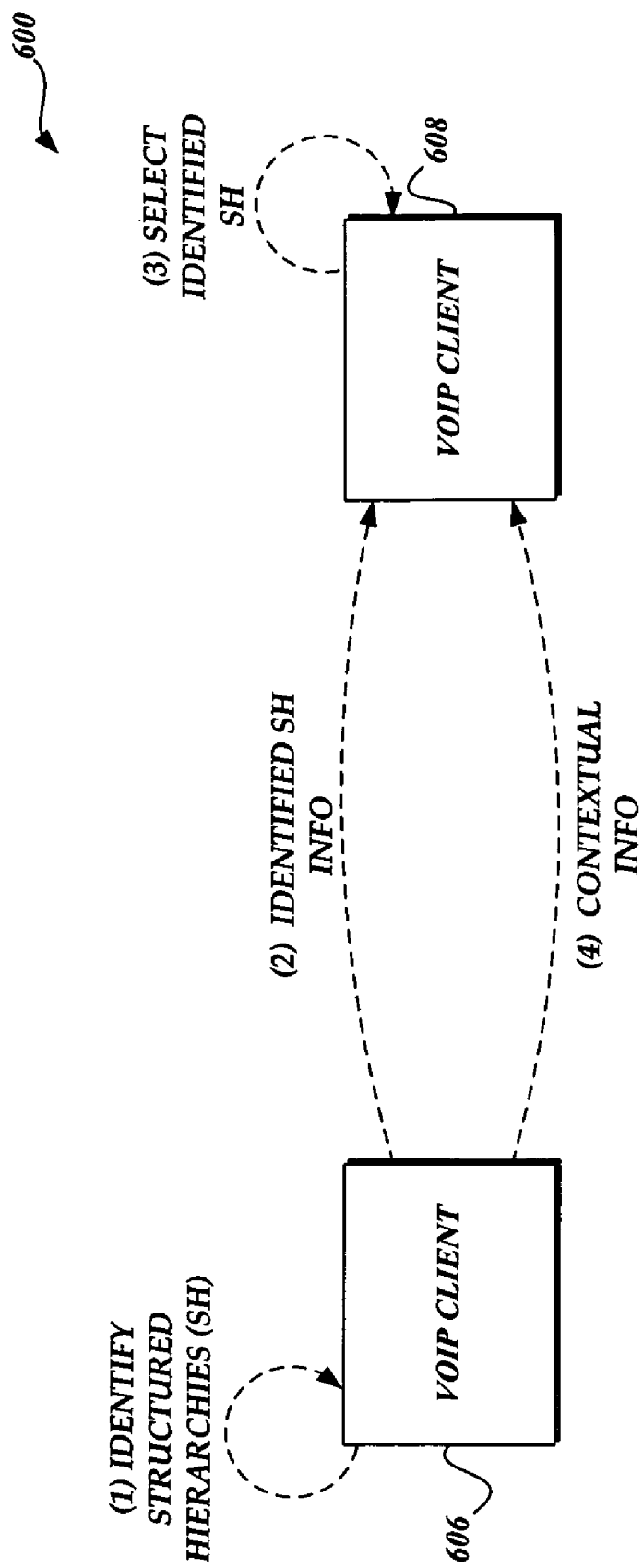
FIG. 6 is a block diagram illustrating interactions between two VoIP clients for transferring contextual information defined by identified structured hierarchies in accordance with an aspect of the present invention.

With reference to FIG. 6, a block diagram 600 illustrating interactions between two VoIP clients for transferring contextual information, in accordance with an embodiment of the present invention, is shown. As with FIG. 4, the example described herein will utilize the scenario in which each client only has one device associated therewith and the connection occurs between those two devices. In one embodiment, devices of VoIP Client 606 and VoIP Client 608 have established a VoIP conversation channel. It may be identified which structured hierarchies will be used to carry certain contextual information by VoIP Client 606. The information regarding the identified structured hierarchies may include information about which structured hierarchies are used to carry the contextual information, how to identify the structured hierarchy, and the like. Such information will be exchanged between VoIP Client 606 and VoIP Client 608 before the corresponding contextual information is exchanged. Upon receipt of the information about which structured hierarchy is used to carry the contextual information, VoIP Client 608 looks up predefined structured hierarchies (e.g., XML namespace and the like) to select the identified structured hierarchies. In one embodiment, the predefined structured hierarchies can be globally stored and managed in a centralized location accessible from a group of VoIP clients. In this embodiment, a Uniform Resource Identifier (URI) address of the centralized location may be transmitted from VoIP Client 606 to VoIP Client 608.

In another embodiment, each VoIP client may have a set of predefined structured hierarchies stored in a local storage of any devices or a dedicated local storage which all devices can share. The predefined structured hierarchies may be declared and agreed upon between VoIP clients before contextual information is exchanged. In this manner, the need to provide the structure of the contextual data packets may be eliminated and thus the amount of transmitted data packets corresponding to the contextual data is reduced. Further, by employing the predefined structured hierarchies, data packets can be transmitted in a manner which is independent of hardware and/or software.

Upon retrieving the identified structured hierarchy, VoIP Client 608 is expecting to receive a data stream such that data packets corresponding to the data stream are defined according to the identified structured hierarchies. VoIP Client 606 can begin sending contextual information represented in accordance with the identified structured hierarchies. In one embodiment, VoIP Client 608 starts a data binding process with respect to the contextual information. For example, instances of the identified structured hierarchies may be constructed with the received contextual information.

Figure 7:
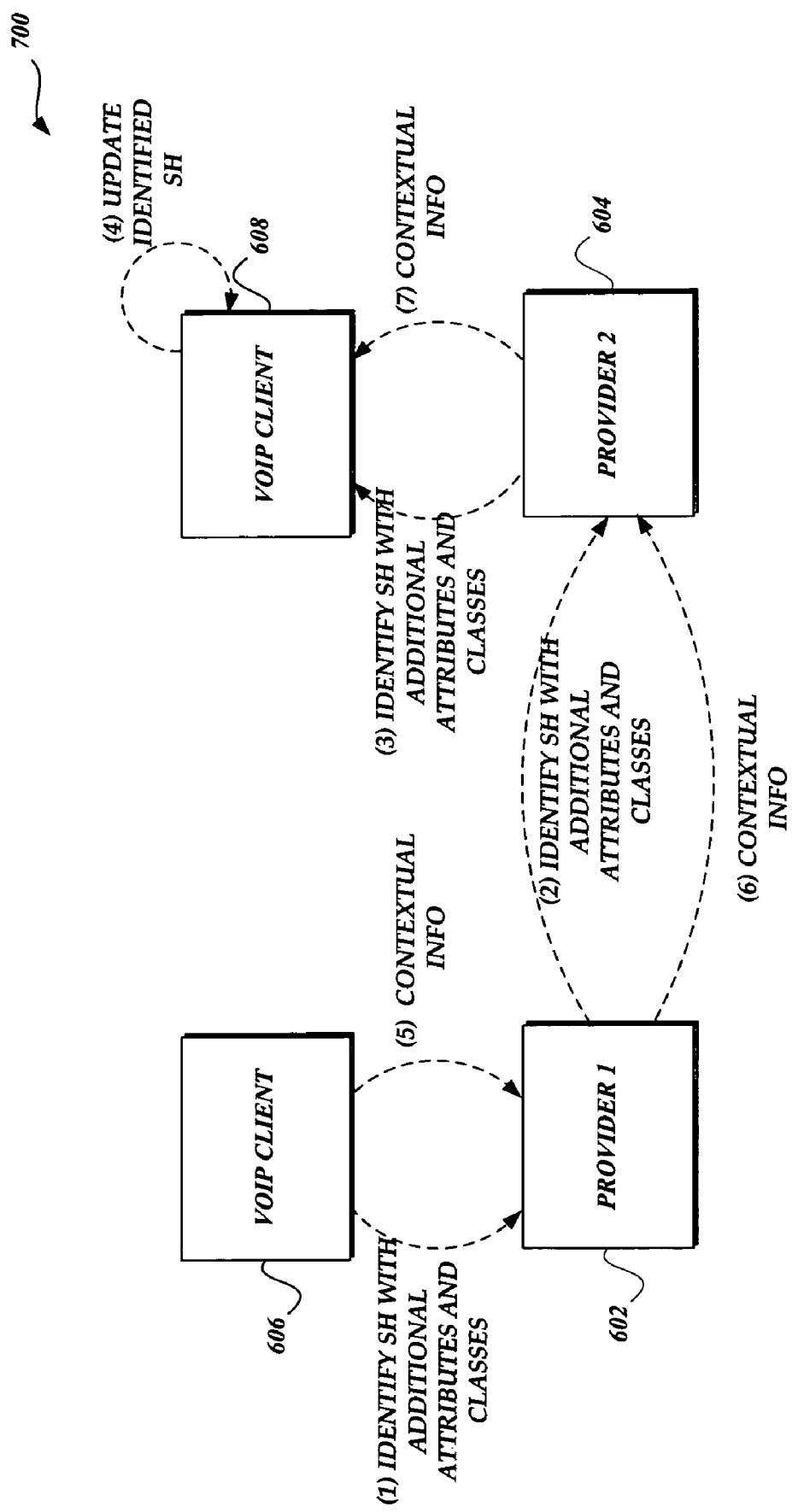
FIG. 7 is a block diagram illustrating interactions between two VoIP clients for establishing additional attributes and/or classes within identified structured hierarchies.
Figure 8:
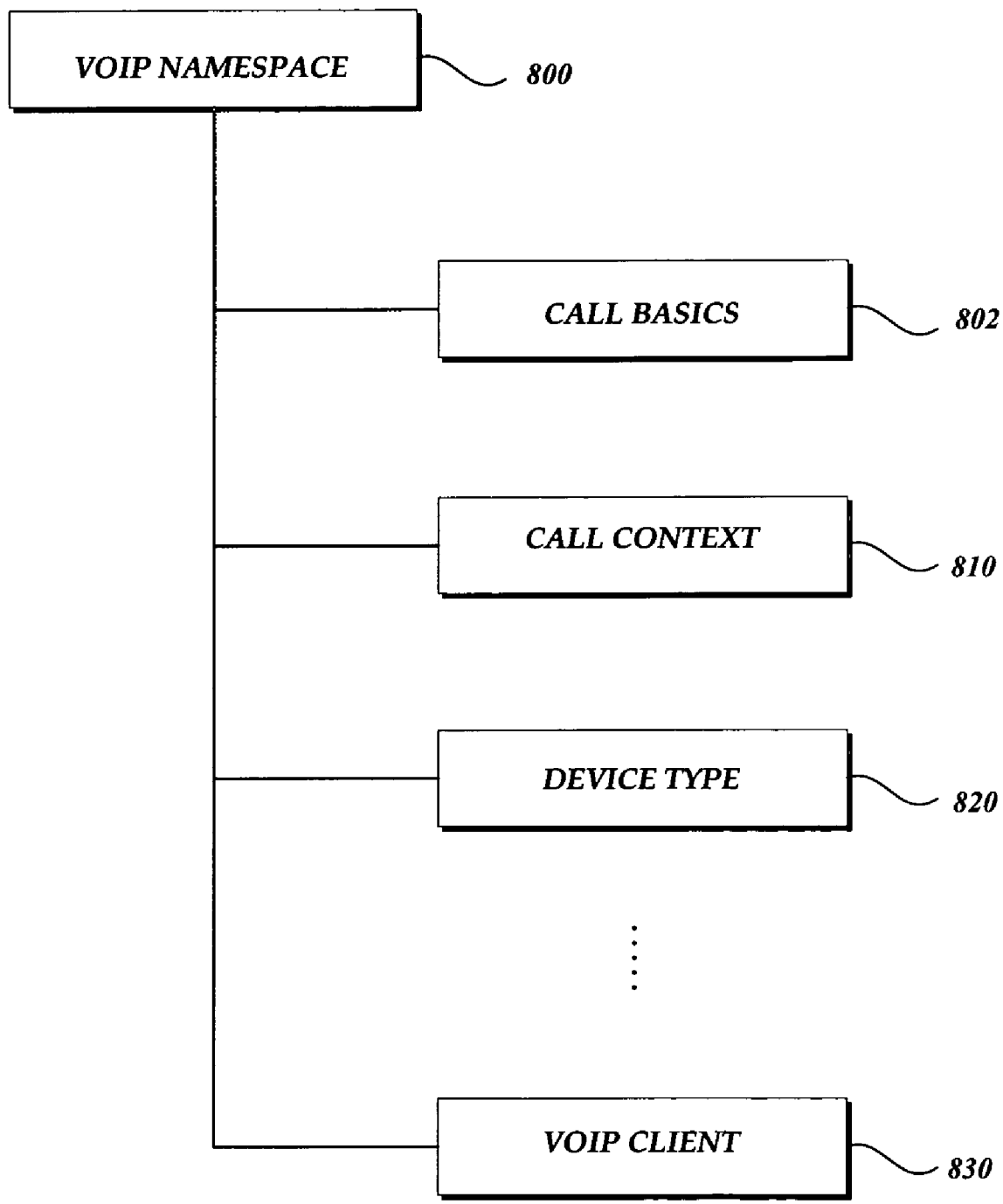
FIGS. 8-12 are block diagrams illustrative of various attributes and classes of structural hierarchies corresponding to VoIP contextual information in accordance with an aspect of the present invention.

Referencing now to FIG. 7, a block diagram 700 illustrates interactions between two VoIP clients for establishing additional attributes and/or classes within identified structured hierarchies. While this example utilizes two VoIP service providers and two VoIP clients, any number and combination of VoIP clients and/or service providers may be used with embodiments of the present invention. In one embodiment, VoIP Client 606 may expand the definition of the predefined structured hierarchies. For discussion purposes, assume that VoIP Client 606 and VoIP Client 608 have a set of predefined structured hierarchies. VoIP Client 606 can define additional classes and/or attributes to the set of predefined structured hierarchies. In this example, we will discuss the illustration of a device of VoIP Client 606 has established a conversation channel with a device of VoIP Client 608. Before sending the particular contextual information, VoIP Client 606 identifies structured hierarchy with additional attributes and classes for the particular contextual information. VoIP Client 606 transmits information corresponding to the identified hierarchy and its additional attributes and classes to Provider 1 602. Provider 1 602 forwards the information corresponding to the identified structured hierarchy and its additional attributes and classes to Provider 2 604. VoIP Client 608 receives the information regarding the identified structured hierarchy and its additional attributes and classes from Provider 2 604. Alternatively, Provider 1 602 forwards such information to VoIP Client 608. VoIP Client 608 updates the locally stored structured hierarchy based on the additional attribute and class information. As a result, the identified structured hierarchies are expanded at VoIP Client 606 and VoIP Client 608. VoIP Client 606 starts sending contextual information represented according to the expanded structured hierarchy to Provider 1 602, which in return sends the received contextual information to Provider 2 604. In one embodiment, upon receipt of the contextual information from Provider 2 604, VoIP Client 608 processes the received contextual information by constructing an instance of the expanded structured hierarchy of the received contextual information.

In one embodiment, the structured hierarchies may be defined by Extensible Markup Language (XML). However, it is to be appreciated that the structured hierarchies can be defined by any language suitable for implementing and maintaining extensible structured hierarchies. Generally described, XML is well known for a cross-platform, software and hardware independent tool for transmitting information. Further, XML maintains its data as a hierarchically-structured tree of nodes, each node comprising a tag that may contain descriptive attributes. Typically, a XML namespace is provided to give the namespace a unique name. In some instances, the namespace may be used as a pointer to a centralized location containing default information about the namespace.

In a particular embodiment, VoIP Client 606 may identify a XML namespace for contextual information. For example, the XML namespace attribute may be placed in the start tag of a sending element. It is to be understood that XML namespaces, attributes, and classes illustrated herein are provided merely as an example of structured hierarchies used in conjunction with various embodiments of the present invention. After VoIP Client 608 receives the XML namespace information, the VoIP Client 606 transmits a set of contextual data packets defined in accordance with the identified XML namespace to VoIP Client 608. When a namespace is defined in the start tag of an element, all child elements with the same prefix are associated with the same namespace. As such, VoIP Client 608 and VoIP Client 606 can transmit contextual information without including prefixes in all the child elements, thereby reducing the amount of data packets transmitted for the contextual information.

With reference to FIGS. 8-12, block diagrams illustrative of various classes and attributes of structured hierarchies corresponding to VoIP contextual information are shown. As mentioned above, structured hierarchies are predefined organizational structures for arraigning contextual information to be exchanged between two or more VoIP devices. Structured hierarchies can be defined, updated, and/or modified by redefining various classes and attributes. The VoIP contextual information exchanged between various VoIP entities (e.g., clients, service providers, etc.) may correspond to a VoIP namespace 800. In one embodiment, the VoIP namespace 800 is represented as a hierarchically structured tree of nodes, each node corresponding to a subclass which corresponds to a subset of VoIP contextual information. For example, a VoIP Namespace 800 may be defined as a hierarchically structured tree comprising a Call Basics Class 802, a Call Contexts Class 810, a Device Type Class 820, a VoIP Client Class 830 and the like.

Figure 9:
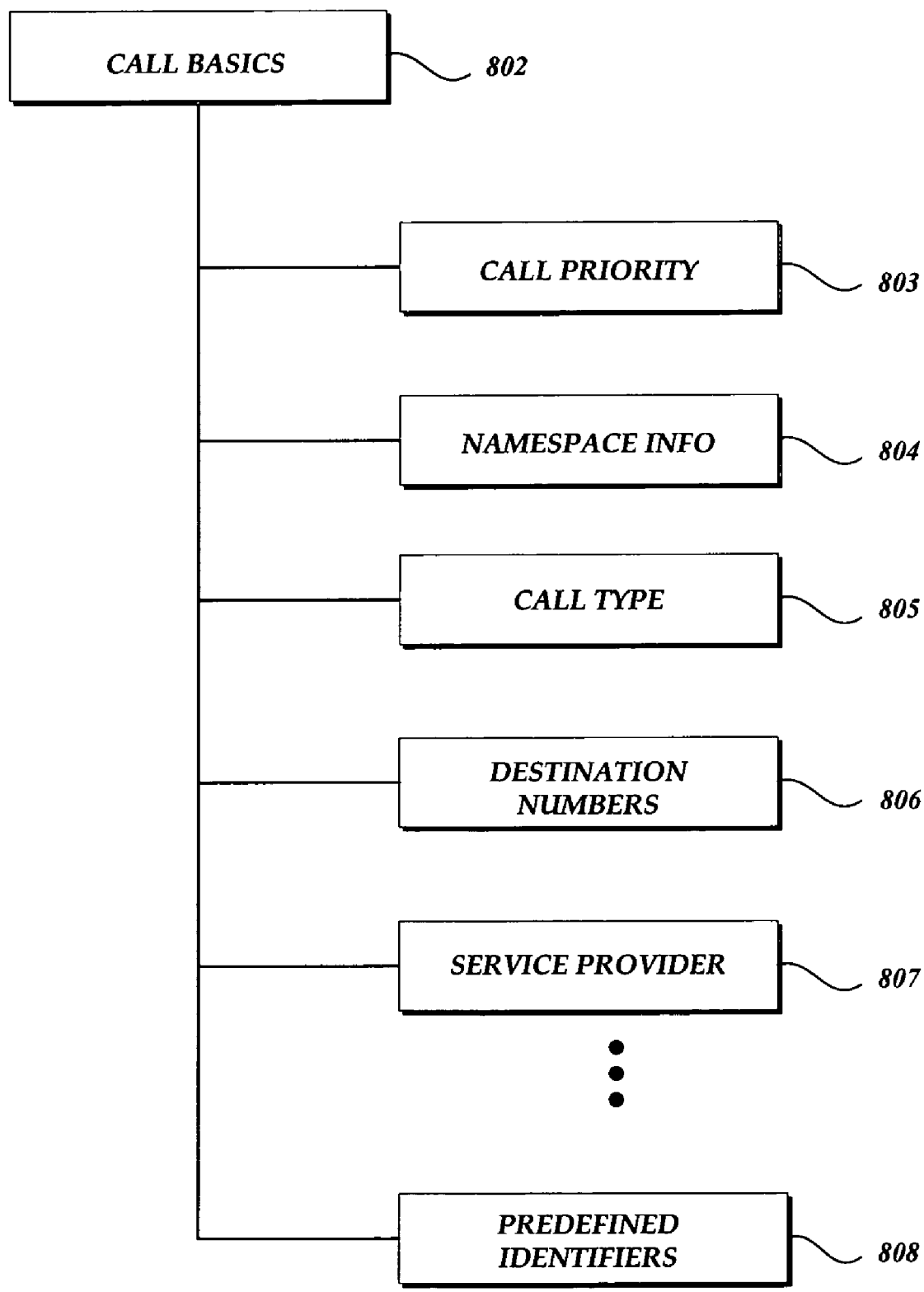

With reference to FIG. 9, a block diagram of a Call Basics Class 802 is shown. In an illustrative embodiment, Call Basics Class 802 may correspond to a subset of VoIP contextual information relating to a conversation channel connection (e.g., a PSTN call connection, a VoIP call connection, and the like). The subset of the VoIP contextual information relating to a conversation channel connection may include originating numbers (e.g., a caller's VoIP ID number), destination numbers (e.g., callees' VoIP ID numbers or telephone numbers), call connection time, VoIP service provider related information, and/or ISP related information such as IP address, MAC address, namespace information, and the like. Additionally, the contextual information relating to a conversation channel connection may include call priority information (which defines the priority levels of the destination numbers), call type information, and the like. The call type information may indicate whether the conversation channel is established for an emergency communication, a broadcasting communication, a computer to computer communication, a computer to POTS device communication, and so forth. In one embodiment, the contextual information relating to a conversation channel connection may include predefined identifiers which represent emotions, sounds (e.g., "ah", "oops", "wow", etc.) and facial expressions in graphical symbols. In one embodiment, a Call Basics Class 802 may be defined as a sub-tree structure of a VoIP Namespace 800, which includes nodes such as call priority 803, namespace information 804, call type 805, destination numbers 806, service provider 807, predefined identifiers 808, and the like.

Figure 10:
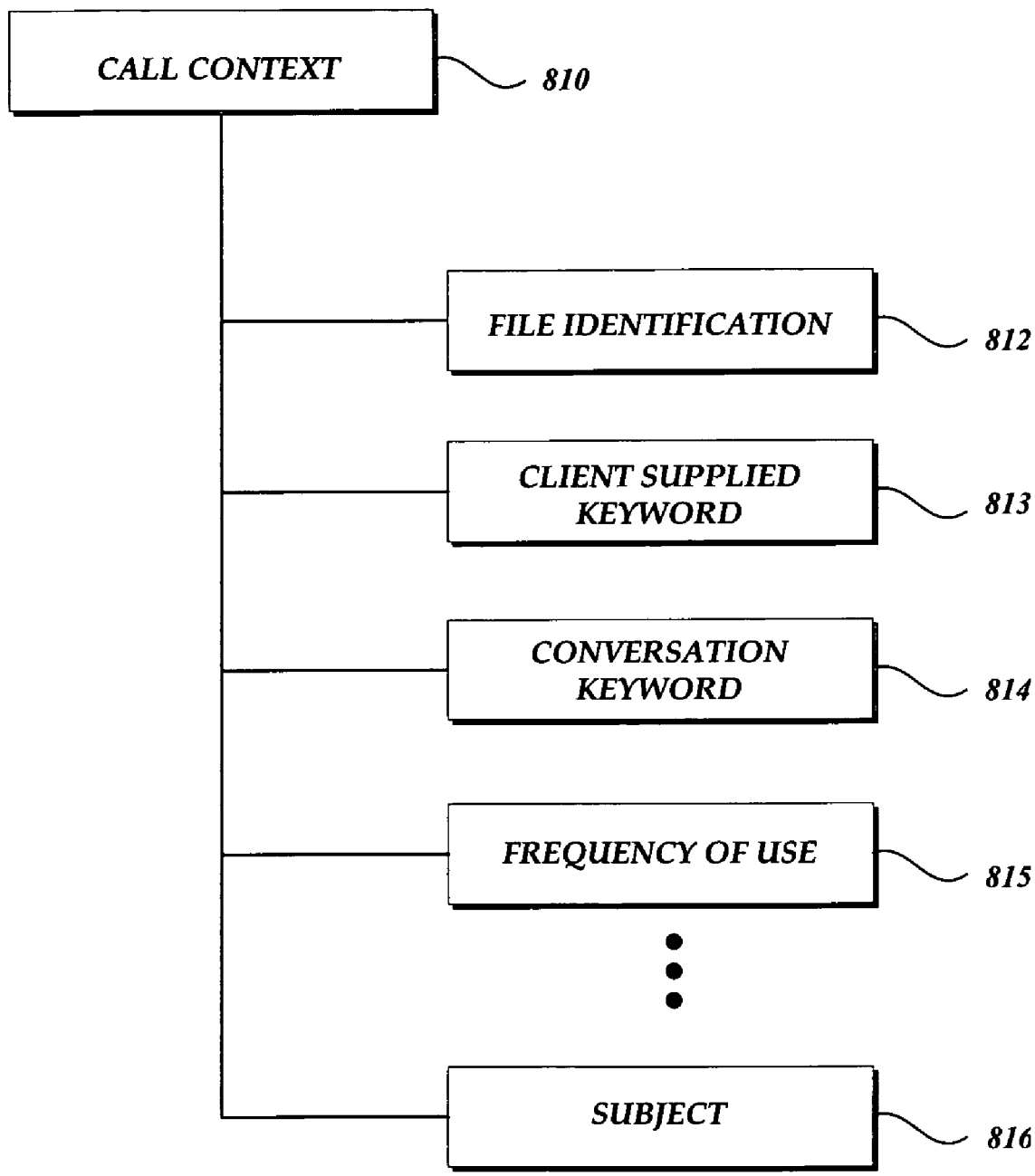

With reference to FIG. 10, a block diagram of a Call Contexts Class 810 is shown. In one embodiment, a subset of VoIP contextual information relating to conversation context may correspond to the Call Contexts Class 810. The contextual information relating to conversation context may include information such as client supplied keywords, identified keywords from document file data, identified keywords from a conversation data packet (e.g., conversation keywords), file names for documents and/or multimedia files exchanged as part of the conversation, game related information (such as a game type, virtual proximity in a certain game), frequency of use (including frequency and duration of calls relating to a certain file, a certain subject, and a certain client), and file identification (such as a case number, a matter number, and the like relating to a conversation), among many others. In accordance with an illustrative embodiment, a Call Contexts Class 810 may be defined as a sub-tree structure of a VoIP Namespace 800, which includes nodes corresponding to file identification 812, client supplied keyword 813, conversation keyword 814, frequency of use 815, subject of the conversation 816, and the like.

Figure 11:
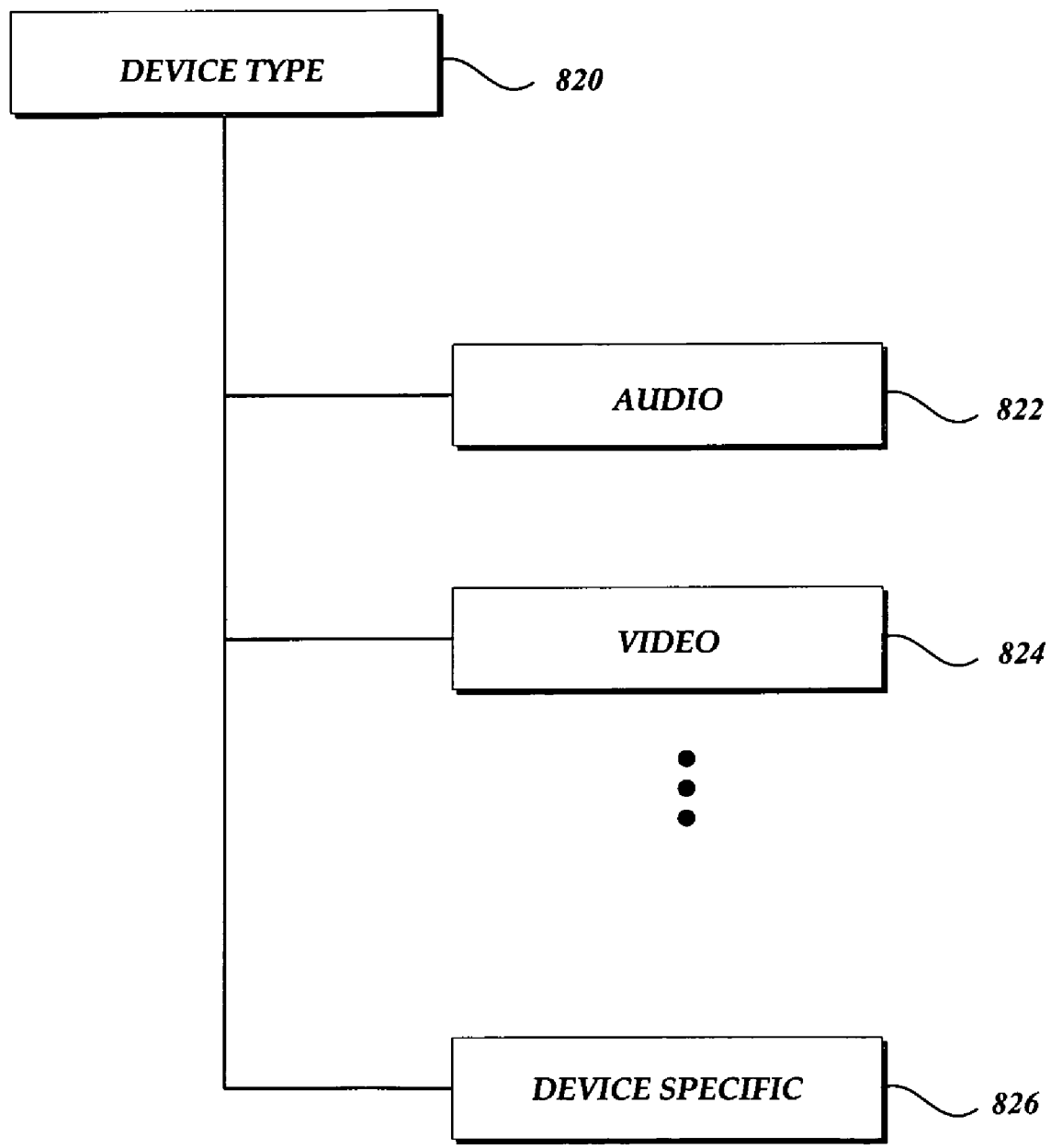

With reference to FIG. 11, a block diagram of a Device Type Class 820 is depicted. In one embodiment, a Device Type Class 820 may correspond to a subset of VoIP contextual information relating to a VoIP client device used for the conversation channel connection. The subset of the VoIP contextual information relating to the VoIP client device may include audio related information which may be needed to process audio data generated by the VoIP client device. The audio related information may include information related to the device's audio functionality and capability, such as sampling rate, machine type, output/input type, microphone, Digital Signal Processing (DSP) card information, and the like. The subset of the VoIP contextual information relating to the VoIP client device may include video related information which may be needed to process video data generated by the VoIP client device. The video related information may include resolution, refresh, type and size of the video data, graphic card information, and the like. The contextual information relating to VoIP client devices may further include other device specific information such as a type of the computer system, processor information, network bandwidth, wireless/wired connection, portability of the computer system, processing settings of the computer system, and the like. In an illustrative embodiment, a Device Type Class 820 may be defined as a sub-tree structure of a VoIP Namespace 800, which includes nodes corresponding to Audio 822, Video 824, Device Specific 826 and the like.

Figure 12:
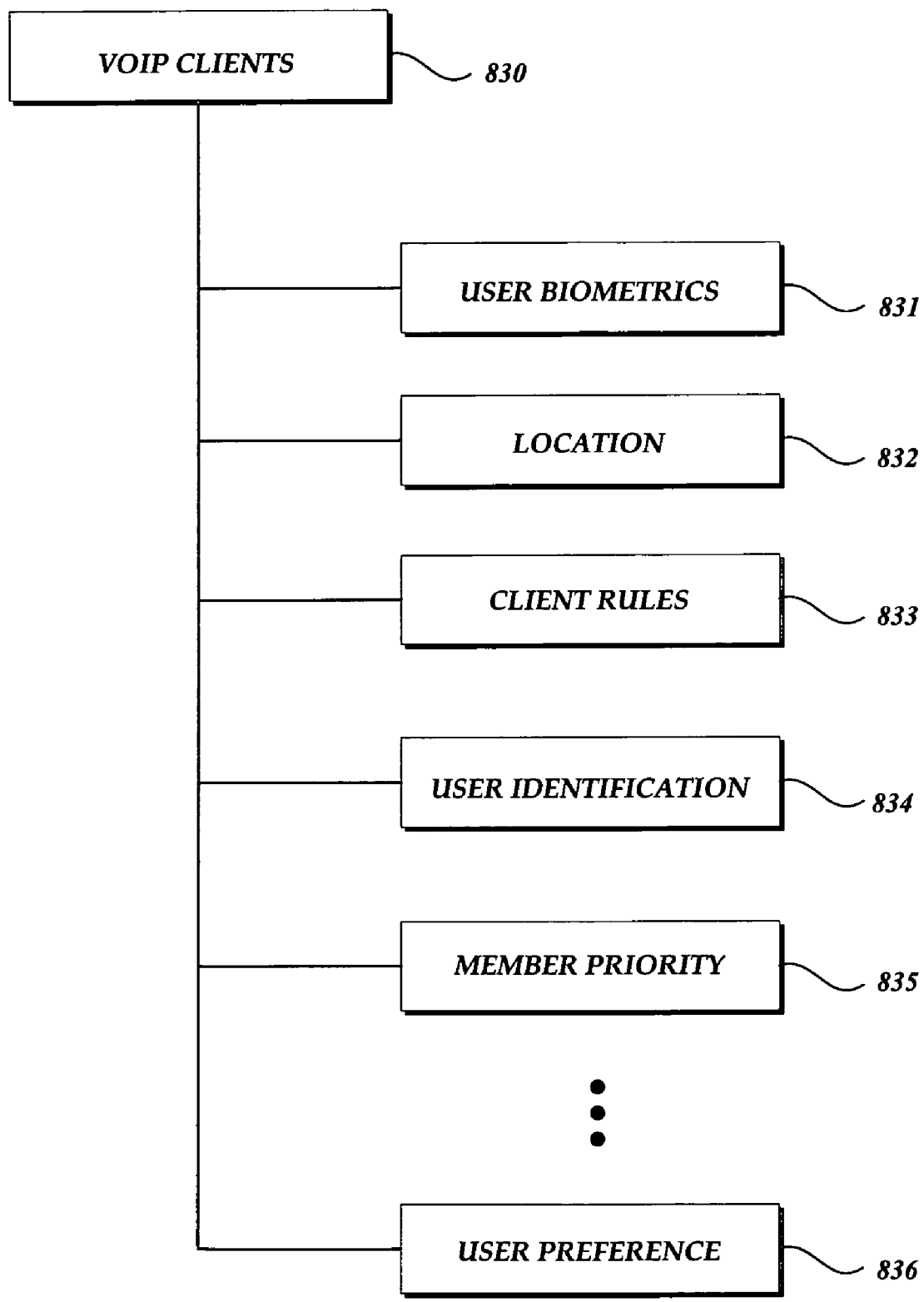

With reference to FIG. 12, a block diagram of a VoIP Client Class 830 is depicted. In accordance with an illustrative embodiment, a VoIP Client Class 830 may correspond to a subset of contextual information relating to VoIP clients. In one embodiment, the subset of the VoIP contextual information relating to the VoIP client may include voice profile information (e.g., a collection of information specifying the tonal and phonetic characteristics of an individual user), digital signature information, and biometric information. The biometric information can include user identification information (e.g., fingerprint) related to biometric authentication, user stress level, user mood, etc. Additionally, the subset of the VoIP contextual information relating to the VoIP client may include location information (including a client defined location, a VoIP defined location, a GPS/triangulation location, and a logical/virtual location of an individual user), assigned phone number, user contact information (such as name, address, company, and the like), rules defined by the client, user preferences, digital rights management (DRM), a member rank of an individual user in an organization, priority associated with the member rank, and the like. The priority associated with the member rank may be used to assign priority to the client for a conference call. In one embodiment, a VoIP Client Class 830 may be defined as a sub-tree structure of a VoIP Namespace 800, which includes nodes corresponding to user biometrics 831, location 832, client rules 833, user identification 834, member priority 835, user preference 836, and the like.

Figure 13:
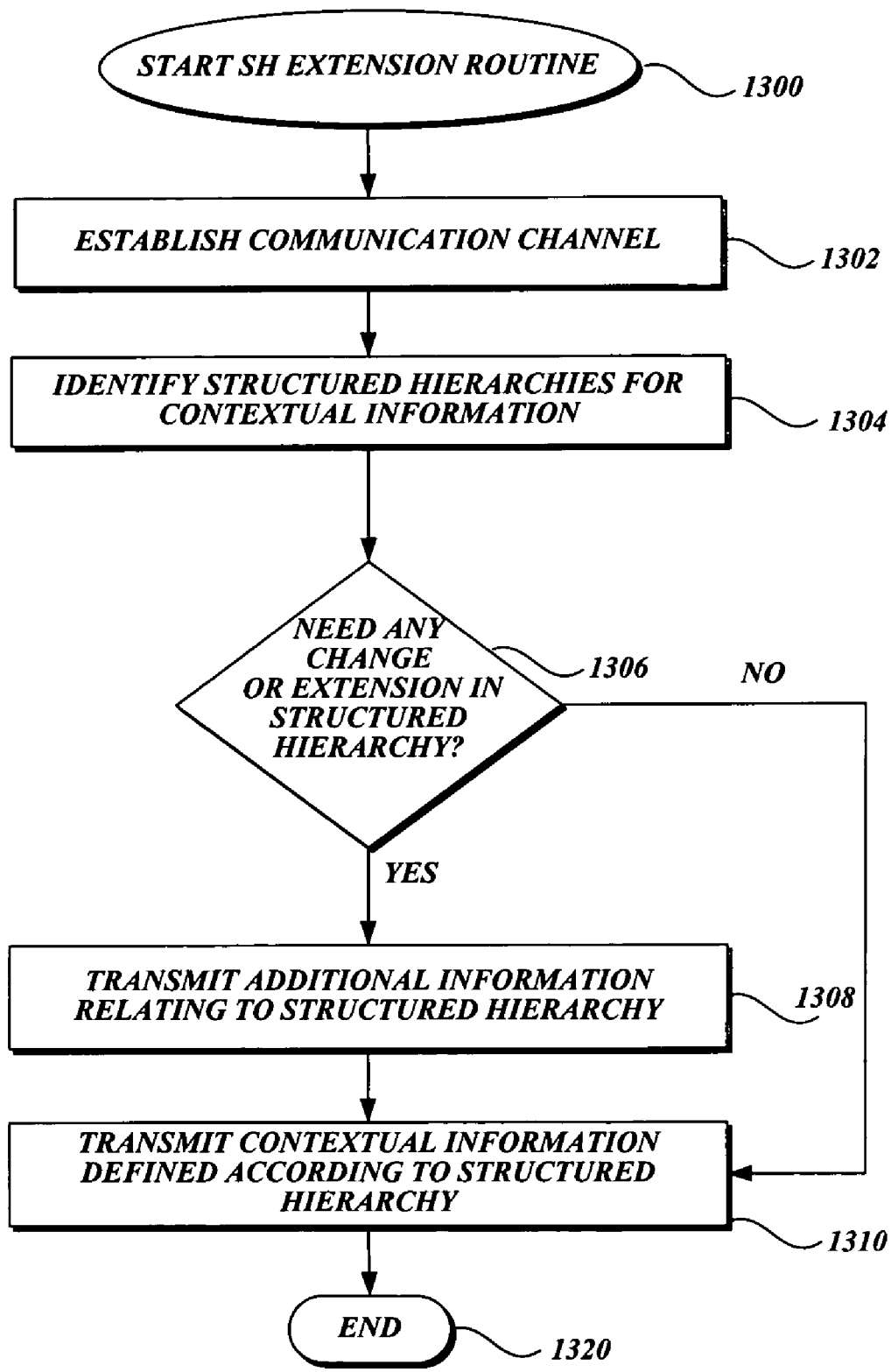
FIG. 13 is a flow diagram of a structured hierarchy extension routine for adding classes and/or attributes to structured hierarchies in accordance with an aspect of the present invention.

With reference to FIG. 13, a flowchart of a structured hierarchy extension routine 1300 for adding classes and/or attributes to structured hierarchies is shown. Beginning at block 1302, a communication channel between devices of an information sending client and an information receiving client is established. The information sending client and the information sending client are VoIP clients engaging in a communication. For discussion purposes, assume that the information sending client and the information receiving client have a set of predefined structured hierarchies. Further, the information sending client can define additional classes and/or attributes to the set of predefined structured hierarchies. In this example, we will discuss the illustration of a device of the information sending client has established a conversation channel with a device of information receiving client. The information sending client may identify a set of contextual information for a conversation with the information receiving client. Based on the content of the identified contextual information, the information sending client further identifies at least one structured hierarchy from predefined structured hierarchies, such as an XML namespace and the like.

At block 1304, the information sending client identifies the structured hierarchies for the identified contextual information. The structured hierarchy extension routine 1300 proceeds to decision block 1306 to determine whether there is a need for any change or extension in the identified structured hierarchies. If it is determined that the identified structured hierarchies are needed to be changed or extended, the information sending client transmits additional information such as additional classes and/or attributes related to the identified structured hierarchy at block 1308. Upon receipt of the additional information and identification of the structured hierarchy, the information receiving client looks up locally stored structured hierarchies to find the identified structured hierarchy. The identified structured hierarchy is updated based on the additional information. The structured hierarchy extension routine 1300 proceeds to block 1310. If it is determined at decision block 1306 that there is no need to change or extend the identified structured hierarchies, the structured hierarchy extension routine 1300 also proceeds to block 1310. At block 1310, the information sending client transmits the contextual information defined according to the identified structure to the receiving client. The structured hierarchy extension routine 1300 terminates at block 1320.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented method for transmitting Voice over Internet Protocol (VoIP) data according to an extensible pregenerated structured hierarchy, the method comprising:
   initializing a conversation channel between a first VoIP client and a second VoIP client;
   exchanging structured hierarchical identification information between the first VoIP client and the second VoIP client, wherein the structured hierarchical identification information indicates an extensible pregenerated structured hierarchy and a location of the extensible pregenerated structured hierarchy;
   obtaining the identified pregenerated structured hierarchy from the location;
   determining whether a modification to the obtained pregenerated structured hierarchy has been received;
   when a modification to the obtained pregenerated structured hierarchy has been received:
      communicating the modification between the first VoIP client and the second VoIP client;
      updating the obtained pregenerated structured hierarchy to include the modification;
      binding contextual data in accordance with the modified pregenerated structured hierarchy to generate contextual data packets, and after binding the contextual data in accordance with the modified pregenerated structured hierarchy, transmitting the VoIP data packets, wherein the VoIP data packets include the contextual data packets bound by the modified pregenerated structured hierarchy and voice data packets, wherein the VoIP data packets cause interface communication between the first VoIP client and the second VoIP client;

when a modification to the obtained pregenerated structured hierarchy has not been received:

binding contextual data in accordance with the obtained pregenerated structured hierarchy to generate contextual data packets, and after binding the contextual data in accordance with the obtained pregenerated structured hierarchy, transmitting the VoIP data packets, wherein the VoIP data packets include the contextual data packets bound by the obtained pregenerated structured hierarchy and voice data packets, wherein the VoIP data packets cause the communication between the first VoIP client and the second VoIP client.

2. The computer-implemented method of claim 1, wherein the extensible pregenerated structured hierarchy corresponds to a set of classes and attributes defining the contextual data.

3. The computer-implemented method of claim 2, wherein the set of classes includes call basics, call contexts, device type, and VoIP clients.

4. The computer-implemented method of claim 3, wherein the set of attributes relate to the class of call basics and include call priority, namespace information, and call type.

5. The computer-implemented method of claim 4, wherein the set of attributes relates to the class of call contexts and include subject information, file identification, and keywords relating to the conversation.

6. The computer-implemented method of claim 3, wherein the set of attributes relates to the class of device type and includes audio information about a device, video information about a device, and device specific information.

7. The computer-implemented method of claim 3, wherein the set of attributes relates to the class of clients and includes biometrics information, location information, and client rules.

8. The computer-implemented method of claim 1, wherein the extensible predefined structured hierarchy is defined by a Markup Language namespace.

9. A computer-readable storage medium having computer executable instructions for transmitting Voice over Internet Protocol (VoIP) data according to an extensible pregenerated structured hierarchy, the instructions comprising:

prior to sending VoIP data packets for communication, exchanging structured hierarchical identification information between a first VoIP client and a second VoIP client, wherein the structured hierarchical identification information indicates an extensible pregenerated structured hierarchy and a location of the extensible pregenerated structured hierarchy;

obtaining the identified pregenerated structured hierarchy from the location;

binding contextual data in accordance with the obtained pregenerated structured hierarchy to generate contextual data packets; and after binding the contextual data in accordance with the obtained pregenerated structured hierarchy, transmitting the VoIP data packets, wherein the VoIP data packets include the contextual data packets bound by the obtained pregenerated structured hierarchy and voice data packets, wherein the VoIP data packets cause the interface communication between the first VoIP client and the second VoIP client.

10. The computer-readable storage medium of claim 9, wherein the extensible pregenerated structured hierarchy corresponds to a set of classes and attributes defining the contextual data.

11. The computer-readable storage medium of claim 10, wherein the set of classes includes call basics, call contexts, device type, and VoIP clients.

12. The computer-readable storage medium of claim 11, wherein the set of attributes relate to the class of call basics and include call priority, namespace information, and call type.

13. The computer-readable storage medium of claim 12, wherein the set of attributes relates to the class of call contexts and include subject information, file identification, and keywords relating to the conversation.

14. The computer-readable storage medium of claim 11, wherein the set of attributes relates to the class of device type and includes audio information about a device, video information about a device, and device specific information.

15. The computer-readable storage medium of claim 11, wherein the set of attributes relates to the class of clients and includes biometrics information, location information, and client rules.

16. The computer-readable storage medium of claim 9, wherein the extensible predefined structured hierarchy is defined by a Markup Language namespace.

17. A system for transmitting Voice over Internet Protocol (VoIP) data according to an extensible pregenerated structured hierarchy, the system comprising:

a processor; and a memory having computer executable instructions stored thereon, wherein the computer executable instructions are configured for:

exchanging structured hierarchical identification information between a first VoIP client and a second VoIP client, wherein the structured hierarchical identification information indicates an extensible pregenerated structured hierarchy and a location of the extensible pregenerated structured hierarchy;

obtaining the identified pregenerated structured hierarchy from the location;

binding contextual data in accordance with the obtained pregenerated structured hierarchy to generate contextual data packets; and after binding the contextual data in accordance with the obtained pregenerated structured hierarchy, transmitting the VoIP data packets, wherein the VoIP data packets include the contextual data packets bound by the obtained pregenerated structured hierarchy and voice data packets, wherein the VoIP data packets cause the interface communication between the first VoIP client and the second VoIP client.

18. The system of claim 17, wherein the extensible pregenerated structured hierarchy corresponds to a set of classes and attributes defining the contextual data.

19. The system of claim 18, wherein the set of classes includes call basics, call contexts, device type, and VoIP clients.

20. The system of claim 19, wherein the set of attributes relate to the class of call basics and include call priority, namespace information, and call type.

* * * * *